United States Patent Office 3,008,804
Patented Nov. 14, 1961

3,008,804
PROCESS FOR THE PRODUCTION OF CONCENTRATED SULFURIC ACID AND OLEUM FROM HYDROGEN SULFIDE CONTAINING GASES
Gustav Rowedder, Frankfurt am Main, Germany, assignor to Metallgesellschaft Aktiengesellschaft, Frankfurt am Main, Germany
No Drawing. Filed Dec. 3, 1957, Ser. No. 700,268
Claims priority, application Germany Dec. 24, 1956
5 Claims. (Cl. 23—168)

The present invention relates to an improved process for the production of concentrated sulfuric acid and/or oleum from $H_2S$ containing gases by the wet catalysis process.

It is known that hydrogen sulfide can be burnt to produce $H_2O$ and $SO_2$ and to work up the thus obtained $SO_2$ to sulfuric acid. In the so-called classic process the mixture of $H_2O$, $SO_2$, nitrogen and possibly other substances, particularly $CO_2$ which is obtained upon combustion of $H_2S$ containing gas, is first cooled to condense the $H_2O$ produced as well as that introduced by the moisture content of the starting gases. Thereafter, the gases are demisted and finally dried, the latter normally being effected with concentrated sulfuric acid. The thus obtained fully dried $SO_2$ containing gas is then catalytically oxidized to $SO_3$, from which either the monohydrate and/or oleum can be obtained in a known manner. As this process is rather costly because of the apparatus required for the gas cooling, demisting and drying, it is in general uneconomical to use in plants of low capacity.

About twenty years ago the so-called "wet catalytic" process became known which also renders it possible to work up smaller quantities of available $H_2S$ containing gases to sulfuric acid economically. In this process the gas mixture produced by burning the $H_2S$ containing gases is directly catalytically converted to $H_2SO_4$ without prior drying. The difficulties engendered in this process by the fact that a considerable portion of the sulfuric acid produced occurs in the form of sulfuric acid fogs or mists can be overcome by suitable control of the process and electrostatic demisting. In rather recent times, the use of a new principle of demisting by mechanical means using porous filters has rendered it possible to provide plants of still further reduced capacity while still permitting economic operation so that plants in which only relatively small quantities of $H_2S$ are produced, such as in coking plants and gas works, are in a position to produce sulfuric acid at a profit from such $H_2S$.

One disadvantage of the wet catalytic process is that in practice it previously has not been possible to produce highly concentrated sulfuric acid of the usual commercial concentration of 66° Bé. or oleum. As in burning $H_2S$, $SO_2$ and $H_2O$ are produced in equimolar proportions it would seem theoretically possible to produce 100% sulfuric acid directly from the combustion gases. However, as in practice the $H_2S$ containing gases as well as the air for its combustion and the air for converting the $SO_2$ to $SO_3$ always contain water vapor, the resulting gas always contains more water vapor than corresponds to the proportion $H_2O:SO_2=1:1$ so that a sulfuric acid of only a concentration of about 80 to 90% is obtained in the condensation plant. Aside from the fact that this concentration is not the normal commercial concentration, steel, cast iron and lead are not resistant to this concentration of acid, especially at the elevated temperatures occurring in such process. For this reason, it has been customary to add further water to the process so that a sulfuric acid of a concentration of about 78% $H_2SO_4=60°$ Bé. is obtained in order that lead apparatus can be employed. If this product cannot be sold or used it must subsequently be concentrated which entails a further cost.

Predrying of the $H_2S$ containing gases as well as the air used in the process would entail such additional costs as to nullify the main advantage of the wet catalytic process and at most only permit the production of monohydrate and not oleum.

According to the invention it was found that these disadvantages of the wet catalytic process could be overcome by adding to the combustion gases obtained in burning $H_2S$ containing gases which contain more than 1 vol. $H_2O$ per volume of $SO_2$, a sufficient quantity of $SO_2$ containing gases containing less than 1 volume of $H_2O$ per volume of $SO_2$ that the mixture, taking into consideration the quantity of water vapor contained in the air required for the oxidation to $SO_3$ or respectively $H_2SO_4$, contains the proportion of $H_2O$ to $SO_2$ required to produce sulfuric acid of the concentration desired. For example, such proportion should be 1:1 for the production of monohydrate or a ratio of about 1:1.4 for the production of oleum containing about 25% of free $SO_3$. The relatively dry $SO_2$ containing gases employed according to the invention can, for example, be obtained by burning hydrogen free sulfur compounds, such as COS or $CS_2$, or preferably by burning elemental sulfur. The use of elemental sulfur has the advantage that in general it requires the lowest transportation-, plant-, and plant operating-costs. It is especially expedient to burn the elemental sulfur in appropriate proportions together with the moist $H_2S$ containing gases in the same furnace. The admixture of $CS_2$ and COS either alone or in admixture with elemental sulfur with the $H_2S$ containing gases to be burned is advantageous when these substances occur as by-products in the same plant where the sulfuric acid is to be produced. In determining the mixing proportion of the combustion gases of the $H_2S$ containing gases and the combustion gases of the sulfur or sulfur compounds it is of course necessary also to take into consideration the quantity of water vapor introduced by the air required for the combustion of the sulfur or sulfur compounds.

The following examples will serve to illustrate the nature of the present invention.

EXAMPLE 1

(a) *Prior art*

A gas containing 20% of $H_2S$ and 80% of inert constituents, principally $CO_2$, and saturated with water vapor at 40° C. was burned with air containing 20 g. of water vapor per normal cubic meter. 17 volumes of air per part by volume of $H_2S$ were employed for such combustion. The resulting moist gases were passed at about 450° C. without intermediate drying to a five pass vanadium contact chamber where conversion of the $SO_2$ to $SO_3$ occurred. The gases which left the contact chamber at about 430° C. were cooled and the sulfuric acid produced recovered therefrom. The sulfuric acid recovered can only be of 87.4% concentration as can be seen from the following calculations (based upon 100 normal cubic meters of $H_2S$ containing gas, the specific weight of $H_2S$ being established as 1.539 kg./Nm.³).

For combustion and conversion of 20 Nm.³=30.78 kg. of $H_2S$, 20×17=340 Nm.³ of air were used. In the process 30.78×80/34=72.4 kg. of $SO_3$ and $$30.78 \times 18/34 = 16.3$$

kg. of water of combustion were produced.

The 101.5 kg. of sulfuric acid recovered per 100 Nm.$^3$ of H$_2$S containing gases is composed of the following:

| | | |
|---|---|---|
| 72.4 kg. | SO$_3$ | derived from the combustion |
| 16.3 kg. | H$_2$O | introduced with the H$_2$S containing gases (60 g. H$_2$O per Nm.$^3$) |
| 6.0 kg. | H$_2$O | |
| 6.8 kg. | H$_2$O | introduced with the air (20 g. per Nm.$^3$) |

101.5 kg. H$_2$SO$_4$

As 72.4 kg. of SO$_3$ in theory correspond to 88.69 kg. of monohydrate the resulting acid had a concentration of $$\frac{88.69}{101.5}$$

or approximately 87.4%.

(b) *Method of operation according to invention to produce 98% H$_2$SO$_4$*

100 Nm.$^3$ of the same H$_2$S containing gas as used in (a) were burnt together with 24.3 kg. of elemental sulfur with 548 Nm.$^3$ (340 Nm.$^3$ for the H$_2$S and an additional 208 Nm.$^3$ for the S) of air of the same moisture content of that used in (a) and the combustion gases converted as in (a). 166.45 kg. of sulfuric acid of 98% concentration were recovered. The additional air required for the S introduced 20 g.×208=4.16 kg. additional H$_2$O into the system (rounded off to 4.2 kg.).

The 166.45 kg. of sulfuric acid is composed of the following:

| | | |
|---|---|---|
| 72.40 kg. | SO$_3$ | derived from the H$_2$S |
| 60.75 kg. | SO$_3$ | derived from the S |
| 16.3 kg. | H$_2$O | derived from H$_2$S combustion |
| 6.0 kg. | H$_2$O | introduced with H$_2$S containing gases |
| 6.8 kg. | H$_2$O | introduced with air required for combustion and conversion H$_2$S |
| 4.2 kg. | H$_2$O | introduced with air required for combustion and conversion of S |

166.45 kg. H$_2$SO$_4$ (i.e., 133.15 kg. SO$_3$+33.3 kg. H$_2$O)

As 133.15 kg. SO$_3$ in theory corresponds to 163.1 kg. monohydrate, the resulting acid had a concentration of $$\frac{163.1}{166.45}$$

or approximately 98.0%.

EXAMPLE 2

*Method of operation according to invention to produce oleum containing about 25% SO$_3$*

The procedure as described in Example 1(b) was repeated except that the H$_2$S containing gases were burnt together with 76.5 kg. instead of 24.3 kg. of elemental sulfur and using an additional 655 Nm.$^3$ of air for combustion and conversion of the sulfur instead of the additional 208 Nm.$^3$ used in Example 1(b). The additional air required for the S in this instance introduced 20 g.×655=13.1 kg. H$_2$O into the system.

307.9 kg. of oleum were recovered which was composed of the following:

| | | |
|---|---|---|
| 72.4 kg. | SO$_3$ | derived from H$_2$S |
| 193.3 kg. | SO$_3$ | derived from S |
| 16.3 kg. | H$_2$O | derived from H$_2$S combustion |
| 6.0 kg. | H$_2$O | introduced with H$_2$S containing gas |
| 6.8 kg. | H$_2$O | introduced with air required for combustion and conversion H$_2$S |
| 13.1 kg. | H$_2$O | introduced with air required for combustion and conversion of S |

307.9 kg. oleum (265.7 kg. SO$_3$+42.2 kg. H$_2$O)

As 42.2 kg. of H$_2$O in theory combined with 187.6 kg. SO$_3$ to produce 229.8 kg. monohydrate, an excess of 78.1 kg. free SO$_3$, that is, about 25.4%, were contained in the 307.9 kg. of oleum recovered.

The process according to the invention is advantageously carried out in conjunction with the aforementioned novel type of mist separation with the aid of porous filters, such as ceramic filter candles, wherein gas speeds are employed which are higher than those corresponding to the break in the logarithmically plotted diagram of the pressure drop versus gas velocity, for, as is well known, a substantial proportion of the sulfuric acid produced by the wet catalysis method occurs in the form of refractive and other sulfuric acid mists of the concentration produced in the process according to the invention are much more suitably separated with such porous filters according to the principle indicated above than by electrostatic separation in which difficulties are encountered with sulfuric acid concentrations higher than about 75 to 80%. Sulfuric mist separation employing porous filters and gas speeds of the order indicated has been described in copending application S.N. 590,069, filed June 7, 1956, now Patent No. 2,947,383.

I claim:

1. In a method of producing a sulfuric acid product selected from the group consisting of concentrated sulfuric acid and oleum of predetermined concentration by the wet catalysis process from combustion gases obtained in the combustion of H$_2$S containing gases in which the moisture content is too high to produce the sulfuric acid product of the predetermined concentration upon being subjected to the wet catalysis process, the steps which comprise burning a material selected from the group of elementary sulfur and hydrogen free sulfur compounds to produce a combustion gas containing SO$_2$ and less than 1 volume of H$_2$O per volume of SO$_2$, incorporating a sufficient quantity of said SO$_2$ containing combustion gas with the high moisture containing gases obtained in the combustion of the H$_2$S containing gases without preliminary drying so that the resulting mixture, taking into consideration the moisture content of the air required for the conversion of the SO$_2$ content thereof to SO$_3$, has the H$_2$O:SO$_2$ proportion necessary for the production of the sulfuric acid product of the predetermined concentration, and subjecting said mixture directly to the wet catalysis process without preliminary drying to produce said sulfuric acid product of the predetermined concentration.

2. The process of claim 1 in which the SO$_2$ containing combustion gas incorporated with the combustion gases obtained in the combustion of the H$_2$S containing gas is a combustion gas obtained in the combustion of elementary sulfur.

3. The process of claim 2 in which the elementary sulfur is combusted together with the H$_2$S containing gases to incorporate the combustion gases obtained from the elementary sulfur with the combustion gases obtained from the H$_2$S containing gases.

4. The process of claim 1 in which the SO$_2$ containing combustion gas incorporated with the combutsion gases obtained in the combustion of the H$_2$S containing gas is a combustion gas obtained in the combustion of hydrogen free sulfur compounds.

5. The process of claim 4 in which the hydrogen free sulfur compounds are combusted together with the H$_2$S containing gases to incorporate the combustion gases obtained from the hydrogen free sulfur compounds with the combustion gases obtained from the H$_2$S containing gases.

References Cited in the file of this patent

UNITED STATES PATENTS

| | | |
|---|---|---|
| 1,923,256 | Clark | Aug. 22, 1933 |
| 2,172,617 | Koolman et al. | Sept. 12, 1939 |
| 2,629,651 | Merriam et al. | Feb. 24, 1953 |

FOREIGN PATENTS

| | | |
|---|---|---|
| 242,681 | Great Britain | Nov. 12, 1925 |